United States Patent
Pujol et al.

(10) Patent No.: US 8,505,850 B2
(45) Date of Patent: Aug. 13, 2013

(54) LOCKING AND UNLOCKING SYSTEM FOR THE COCKPIT DOOR OF AN AIRCRAFT AND DOOR WITH SUCH A SYSTEM

(75) Inventors: Olivier Pujol, Beauzelle (FR); Serge Roques, Cornebarrieu (FR)

(73) Assignee: Airbus Operations SAS, Toulouse (FR)

(*) Notice: Subject to any disclaimer, the term of this patent is extended or adjusted under 35 U.S.C. 154(b) by 0 days.

(21) Appl. No.: 12/442,518

(22) PCT Filed: Sep. 14, 2007

(86) PCT No.: PCT/FR2007/051932
§ 371 (c)(1),
(2), (4) Date: Jan. 28, 2010

(87) PCT Pub. No.: WO2008/034992
PCT Pub. Date: Mar. 27, 2008

(65) Prior Publication Data
US 2010/0140407 A1    Jun. 10, 2010

(30) Foreign Application Priority Data
Sep. 22, 2006 (FR) ...................... 06 53917

(51) Int. Cl.
*B64C 1/14* (2006.01)
*E05B 65/12* (2006.01)

(52) U.S. Cl.
USPC .................... 244/129.5; 244/118.5

(58) Field of Classification Search
USPC ............ 244/129.5, 120, 121, 118.5
See application file for complete search history.

(56) References Cited

U.S. PATENT DOCUMENTS

| | | | | |
|---|---|---|---|---|
| 3,680,499 A | * | 8/1972 | Boudreau | 109/32 |
| 3,704,845 A | * | 12/1972 | Ord | 244/121 |
| 4,522,359 A | * | 6/1985 | Church et al. | 244/129.5 |
| 4,552,326 A | * | 11/1985 | Bokalot | 244/129.5 |
| 4,744,021 A | * | 5/1988 | Kristy | 700/12 |
| 4,915,326 A | * | 4/1990 | Plude | 244/129.5 |
| 6,158,692 A | * | 12/2000 | Abild et al. | 244/129.5 |
| 6,467,729 B2 | * | 10/2002 | Buchs et al. | 244/129.5 |
| 6,499,005 B2 | * | 12/2002 | Gunderson et al. | 703/8 |
| 6,547,185 B2 | * | 4/2003 | Erben et al. | 244/129.5 |
| 6,659,401 B1 | * | 12/2003 | Semprini | 244/118.5 |
| 6,915,986 B2 | * | 7/2005 | D'Alvia | 244/118.5 |
| 7,568,659 B2 | * | 8/2009 | Roques et al. | 244/121 |
| 2003/0062446 A1 | * | 4/2003 | Arias | 244/118.5 |
| 2005/0006528 A1 | * | 1/2005 | Movsesian et al. | 244/129.5 |
| 2005/0218266 A1 | * | 10/2005 | Bandy et al. | 244/118.5 |

FOREIGN PATENT DOCUMENTS

| | | |
|---|---|---|
| EP | 1 347 421 A2 | 9/2003 |
| FR | 2 848 179 A1 | 6/2004 |
| GB | 573513 | 9/1943 |
| GB | 2 419 158 A | 4/2006 |

* cited by examiner

Primary Examiner — Robert Canfield
Assistant Examiner — Jessie Fonseca
(74) Attorney, Agent, or Firm — Patterson Thuente Pedersen, P.A.

(57) ABSTRACT

Embodiments relate to a locking and unlocking system of a separation door separating a cockpit from a cabin of an aircraft. In one embodiment, a system comprises a set of electrically controlled bolts configured to lock the door, a control unit configured to electrically control the set of bolts, a first manual control connected to the control unit, installed in the cockpit and configured to unlock the door, a second manual control connected to the control unit, installed in the cabin and configured to unlock the door, an accelerometer to detect a crash, and a switching relay to control automatic unlocking of the door when a crash of the aircraft is detected, the relay connected to the accelerometer, the control unit and the set of bolts.

10 Claims, 2 Drawing Sheets

LOCKING AND UNLOCKING SYSTEM FOR THE COCKPIT DOOR OF AN AIRCRAFT AND DOOR WITH SUCH A SYSTEM

RELATED APPLICATION

This application claims priority to PCT Application No. PCT/FR2007/051932 filed Sep. 14, 2007, which claims priority to French Application No. 0653917 filed on Sep. 22, 2006, which are incorporated herein by reference.

FIELD OF THE INVENTION

The invention relates to a locking and unlocking system for a separation door between a cockpit and an aircraft cabin such that the separation door is unlocked automatically in case the aircraft crashes.

BACKGROUND

The invention has applications in the aeronautics, such as in the field related to the safety of the members of the crew of an aircraft, including the pilots. In the aeronautics field, particularly for aircraft that transport passengers, there is a door that separates the cockpit from the passenger cabin. This separation door is secured in order to protect the pilots from any attack by one or more passengers, particularly a terrorist attack.

In order to accomplish this, the separation door is reinforced. It is also locked. Locking may occur automatically as soon as the aircraft leaves the parking area or as soon as the access doors to the passenger cabin are closed. Furthermore, to make the door more bullet-proof, the door frame is reinforced, which makes it possible to prevent a passenger from firing bullets through the gap between the door and its frame.

FIG. 1 is an overview of the front of an aircraft 1 equipped with a standard separation door 5 between the passenger cabin 3 and the cockpit 2 of the aircraft. The cockpit 2 is intended to accommodate at least part of the aircraft's flight crew. The cabin 3 is intended to accommodate the aircraft's passengers and, potentially, part of the flight crew.

The separation door 5 is positioned in a partition 4 separating the cockpit 2 and the cabin 3. The separation door 5 includes a cockpit-side face 5a and a cabin-side face 5b. The door 5 is placed perpendicular to the surface of the aircraft floor. The door 5 is mounted on a door frame 7 by means of hinges 6, aligned along an axis perpendicular to the surface of the floor. The hinges 6 are generally located on the cockpit side 5b of the door so that the passengers cannot access them from the cabin. The door frame 7 may comprise a stop face that partially covers the cabin side 5a of the door when this door is closed, that is, when it blocks passage between the cockpit and the cabin. The door frame 7 is produced so that there are no gaps between the door 5 and this frame 7 so that an armed person located in the cabin 3 of the aircraft cannot fire bullets through these gaps.

In the door configuration just described, the door 5 and the door frame 7 only allow the door to open toward the cockpit 2. It is understood that the door 5 may also be mounted on its frame 7 in the opposite manner or differently, for certain applications.

An example of this type of secured door is described in patent application FR-A-2 848 179. This type of cockpit door is designed to be compatible with the security measures currently aimed at reinforcing the safety of the flight crew installed in the cockpit. This door is also adapted to withstand depressurization that may occur inside the aircraft and, more specifically, inside the aircraft cabin.

To satisfy the current safety regulations, this separation door is locked as soon as the aircraft leaves the parking area and for the entire duration of the flight. An example of a standard locking system is shown in FIG. 2. This locking system comprises a set of electric strikers 12 or bolts installed in the side of the door, that is, in the edge of the door or near the edge of the door. In locked position, these bolts are inserted in tumblers mounted in the door frame 7 or in openings in the frame 7 adapted to received these bolts. This set of bolts is controlled electrically. More specifically, these electric bolts are continuously powered to ensure that the door is locked. When the electric power supply is cut off, the bolts slide toward an unlocked position. The door is then unlocked.

This locking system therefore locks the door 5 electrically. The flight crew installed in the cockpit 2, hereinafter called the cockpit crew, can open the door, that is, unlock the door by means of a manual unlocking control 8, for example a control lever. This manual control 8, hereinafter called the lever, is connected to a control unit 10 of the door that electronically controls the locking and unlocking of the door 5. If the flight crew installed in the cabin 3 of the aircraft, hereinafter called the cabin crew, needs to enter the cockpit, for example to bring the cockpit crew a meal, this cabin crew has the option of entering a code on an alphanumerical keypad 9 installed in the cabin 3 near the door 5. This code controls a buzzer 11 installed in the cockpit 2, which issues a sound signal. This buzzer indicates to the cockpit crew that a member of the cabin crew is requesting access to the cockpit. The cockpit crew may then decide to open the door 5; to do so, they activate the lever 8, which, through the control unit 10, cuts off the power to the locking system, unlocking the door. Aside from this buzzer, the cockpit crew may choose whether to activate the unlocking control lever or not.

If the cockpit crew is unable to react to unlock the door, for example, if the cockpit crew has lost consciousness, it is important for the cabin crew to be able to rescue the cockpit crew. To do so, the alphanumerical keyboard 9 located near the door 5 allows the cabin crew, by means of a specific procedure, to unlock the separation door directly, after a certain time interval, 30 seconds, for example, thus allowing the cabin crew to rescue the cockpit crew. This specific procedure is such that it cannot be performed by the passengers in the cabin and, more particularly, by terrorists.

FIG. 3 shows an electrical diagram of the locking systems of FIG. 2. This electrical diagram shows the different connections between the different components of the system. The control unit 10 is connected to the buzzer 11 and to the alphanumerical keypad 9. The control unit 10 is also connected to all of the bolts 12 and to the unlocking lever 8. The control unit 10 is also connected to a breaker 13 that ensures the electrical safety of the system. It is thus understood that the control unit 10 manages the transmission of the sound signal to the buzzer 11. The control unit 10 also controls the unlocking of all the bolts 12 based on the signals received from the manual controls, namely the lever 8 and the keypad 9, by transmitting electrical power to all of the bolts or by cutting off this electrical power. This electrical power cutoff is therefore controlled only by the control unit 10 based on an order received from the control lever 8 or from the alphanumerical keypad 9.

However, if the aircraft crashes, it is possible that certain deformations of the door or of the door frames may prevent the cabin crew from unlocking the door using the keypad. In this case, it is necessary to wait for the specialized ground response teams to destroy the door using cutting tools such as axes to enter the cockpit and rescue the cockpit crew, which may take a relatively long period of time. Now, it has been shown that an aircraft may catch fire relatively quickly (in around a few minutes) after a crash. The time necessary for the specialized response teams to respond is, in this case, too long to allow the cockpit crew to get out in time.

SUMMARY

Embodiments relate to a locking and unlocking system of a separation door separating a cockpit from a cabin of an aircraft. In one embodiment, a system comprises a set of electrically controlled bolts configured to lock the door, a control unit configured to electrically control the set of bolts, a first manual control connected to the control unit, installed in the cockpit and configured to unlock the door, a second manual control unit connected to the control unit, installed in the cabin, and configured to unlock the door, an accelerometer to detect a crash, and a switching relay to control automatic unlocking of the door when a crash of the aircraft is detected, the relay connected to the accelerometer, the control unit and the set of bolts.

In one embodiment, a separation door between a cockpit and a cabin of an aircraft comprises a locking and unlocking system. The door can comprise a braking mechanism so that opening of the door can be controlled when it is unlocked.

In another embodiment, an aircraft comprises a cockpit and a passenger cabin separated by a door equipped with a locking and unlocking system.

DETAILED DESCRIPTION

Embodiments of the invention propose systems and methods making it possible to unlock a separation door in case an aircraft crashes. Thus, if the door is locked at the time of the crash, the cabin crew can get to the cockpit crew. Furthermore, the response teams can reach the cockpit crew faster. Embodiments of the invention provide a locking and unlocking system for a separation door of an aircraft comprising a means for automatically controlling unlocking when a crash is detected.

The locking and unlocking system of a separation door comprises means for automatic unlocking in case the aircraft crashes. The system allows the automatic opening of the cockpit door in case of a crash, while at the same time maintaining the integrity and the functionality of the separation door during flight phases. The regulations in force are therefore complied with, however an additional measure of safety is provided in case of a crash.

Figure 1:
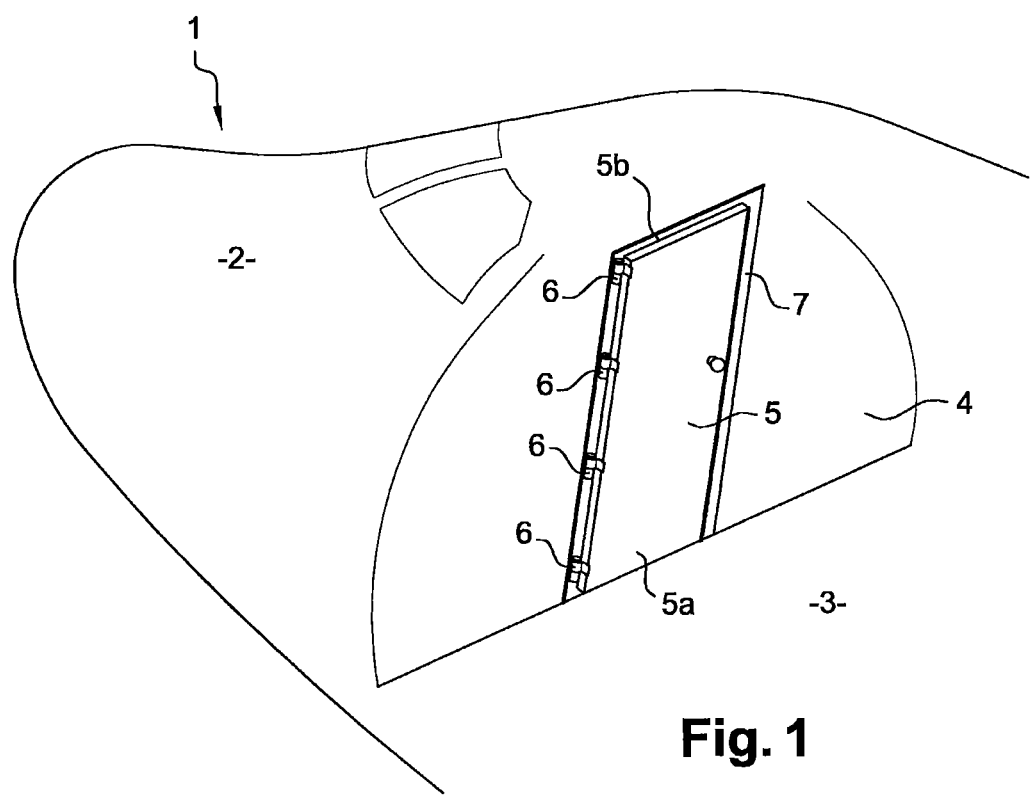
FIG. 1 depicts an example of a security door separating a cockpit from a cabin in an aircraft.
Figure 2:
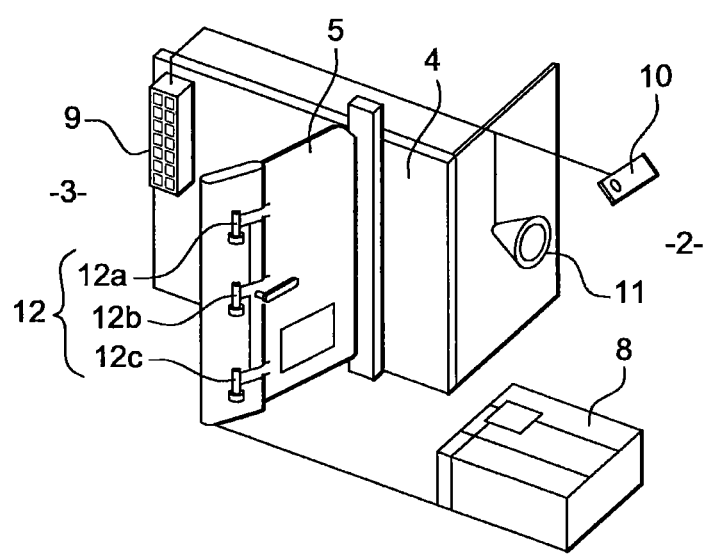
FIG. 2 depicts an example of a locking and unlocking system.
Figure 3:
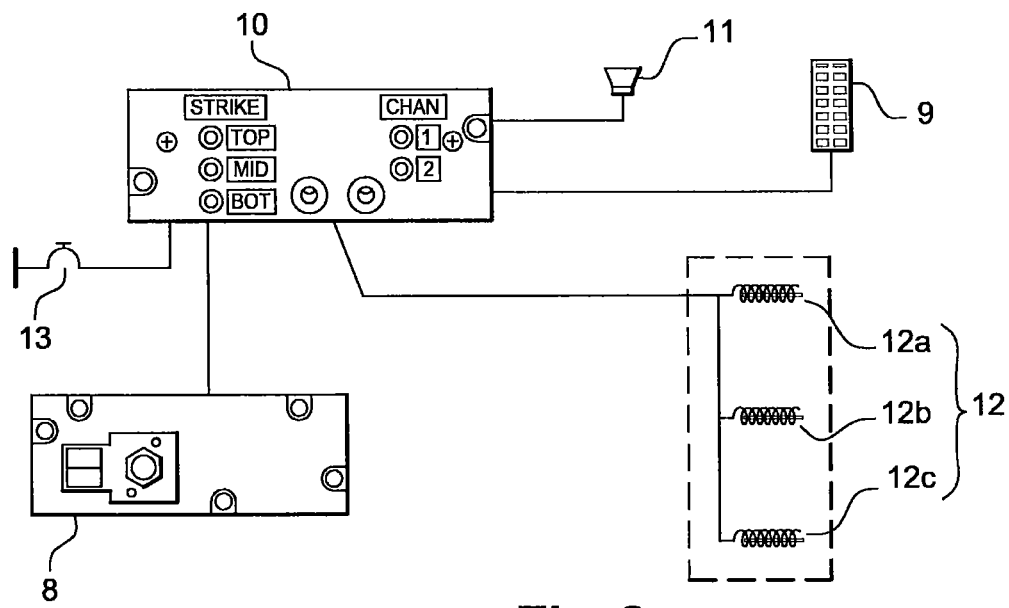
FIG. 3 depicts an electrical diagram of the locking and unlocking system of FIG. 2.
Figure 4:
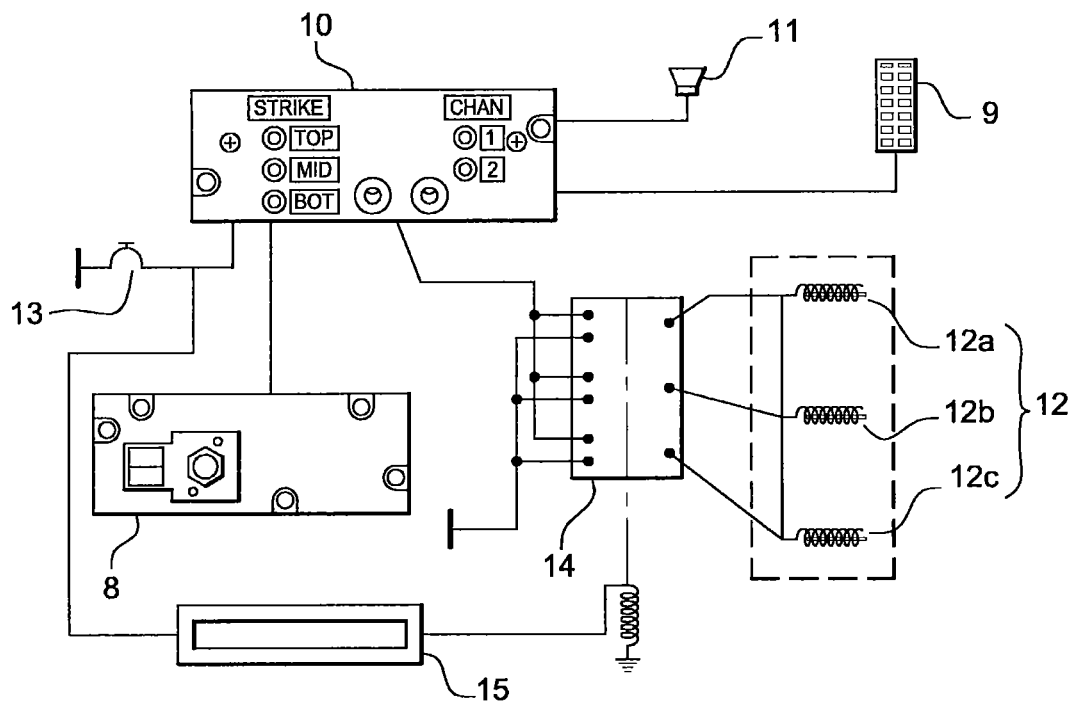
FIG. 4 is an electrical diagram of the locking and unlocking system of an aircraft door according to an embodiment.

FIG. 4 is an example of an electrical diagram of an embodiment of the locking and unlocking system. This system comprises a control unit 10 connected at an input to a control lever 8 and an alphanumerical keypad 9. The control unit 10 is also connected at an input to an accelerometer 15.

The accelerometer 15 and the control unit 10 are connected to a breaker 13 that ensures the electrical interlock of the system.

The control unit 10 is connected at an output to a buzzer 11 and to a set of bolts 12 through a switching relay. The control unit 10 controls the signals at its output based on the signals received at its inputs.

The switching relay 14 as well as the accelerometer 15 are means for unlocking the separation door automatically if a crash of the aircraft is detected. The accelerometer 15 measures the acceleration of the aircraft. If an aircraft is in crash phase, its acceleration increases in relative fashion. Thus, as soon as the accelerometer 15 detects an acceleration that exceeds a certain threshold, a threshold of 1G, for example, the accelerometer sends a signal to the control unit 10. Upon receiving the signal from the accelerometer 15, the control unit 10 sends a signal to the switching relay 14. This switching relay 14 is connected individually to each of the bolts of the set of bolts 12. For example, if the set of bolts comprises three bolts, namely a top bolt 12a, a middle bolt 12b and a bottom bold 12c, then the switching relay 14 is connected by three of its outputs to the three bolts 12a, 12b and 12c of the set of bolts 12.

Thus, during normal operation, the switching relay 14 transmits the electrical current to the bolt set of bolts 12. The switching relay 14 momentarily cuts off the power supply of the set of bolts 12 when it receives an unlocking signal from the control unit 10.

In safety operation, when the accelerometer 15 detects abnormal acceleration higher than the preset threshold, the accelerometer 15 activates the switching relay 14 via the control unit 10. The switching relay 14 definitively cuts off the electrical power supply for the different bolts of the bolt set 12, through grounding. As the bolts are no longer supplied with electricity, the bolts relax and the door is unlocked. The cockpit door is then free to open. Furthermore, at the moment of the crash, the forces resulting from the acceleration applied to the unlocked door ensure that this door opens automatically and immediately. It is then possible for the cabin crew or the response teams to rescue the cockpit crew immediately.

The specific accelerations of an aircraft in case of a crash are well known in the aeronautics field. In fact, constant acceleration is impossible during flight. If constant acceleration is detected, with a value over a preset threshold, this means that the aircraft is in a dangerous descent. It is then in crash condition. The detection of this type of acceleration cannot be erroneous, so there is no possible unexpected unlocking of the door by the system of the invention.

Furthermore, aircraft acceleration cannot be created artificially by a passenger to allow automatic unlocking of the door. As a result, the only acceleration likely to trigger the switching relay is acceleration due to a crash.

In one embodiment, such as to further increase the safety of the system, the accelerometer is installed in a location of the aircraft that is not accessible from the cabin.

In various embodiments, the separation door is equipped with a brake, a hydropneumatic brake, for example, that offers the advantage of slowing the opening of the door then keeping the door in the open position, making it easier for the specialized forces to get through. However, if the impact of the crash results in closing the door, this door is closed but not locked, since the bolts are no longer electrically powered. The emergency response teams can then simply open the door as in the case of the old, unsecured doors.

The invention claimed is:

1. A locking and unlocking system for a separation door separating a cockpit from a cabin of an aircraft comprising:

a set of electrically controlled bolts configured to lock the door;

a control unit configured to electrically control the set of bolts;

a first manual control connected to the control unit, installed in the cockpit and configured to unlock the door;

a second manual control connected to the control unit, installed in the cabin and configured to unlock the door;

a switching relay to control automatic unlocking of the set of electrically controlled bolts, and a system for disabling the locking and unlocking system, the system for disabling the locking and unlocking system comprising:

an accelerometer configured to detect a maintained constant acceleration exceeding a preselected acceleration threshold value that indicates that the aircraft is in a dangerous descent, wherein the accelerometer sends a signal to the control unit, when the constant acceleration exceeds the threshold value, the control unit sends a signal based solely on the signal received from the accelerometer to the switching relay that disables the locking and unlocking system after receiving said signal from the accelerometer by activating the switching relay to definitively cut off the electrical power supply for the bolts of the bolt set by grounding the electrical power supply after receiving said signal from the control unit.

2. The system of claim 1, wherein the accelerometer is installed in a location of the aircraft that is inaccessible from the cabin.

3. The system of claim 1, wherein the switching relay is connected individually to each bolt of the set of bolts.

4. The system of claim 1, wherein the first manual control comprises a lever.

5. The system of claim 1, wherein the second manual control comprises an alphanumeric keypad.

6. An aircraft having a cockpit and a cabin comprising:
a separation door between the cockpit and the cabin able to be locked during flight phases and automatically unlocked in case of acceleration exceeding a selected value, the door comprising a locking and unlocking system comprising:

a set of electrically controlled bolts configured to lock the door, a control unit configured to electrically control the set of bolts, a first manual control connected to the control unit, installed in the cockpit and configured to unlock the door, a second manual control connected to the control unit, installed in the cabin and configured to unlock the door, a switching relay to control automatic unlocking of the door, and a system for disabling the locking and unlocking system, the system for disabling the locking and unlocking system comprising:

an accelerometer configured to detect a constant acceleration exceeding a preselected acceleration threshold value, wherein the accelerometer sends a signal to the control unit, when the acceleration exceeds the threshold value that indicates that the aircraft is in a dangerous descent, the control unit sends a signal based solely on the signal received from the accelerometer to the switching relay that disables the locking and unlocking system after receiving said signal from the accelerometer by activating the switching relay to definitively cut off the electrical power supply for the bolts of the bolt set by grounding the electrical power supply after receiving said signal from the control unit.

7. The aircraft of claim 6, wherein the accelerometer is installed in a location of the aircraft that is inaccessible from the cabin.

8. The aircraft of claim 6, wherein the switching relay is connected individually to each bolt of the set of bolts.

9. The aircraft of claim 6, wherein the first manual control comprises a lever.

10. The aircraft of claim 6, wherein the second manual control comprises an alphanumeric keypad.

* * * * *